Figure 1:
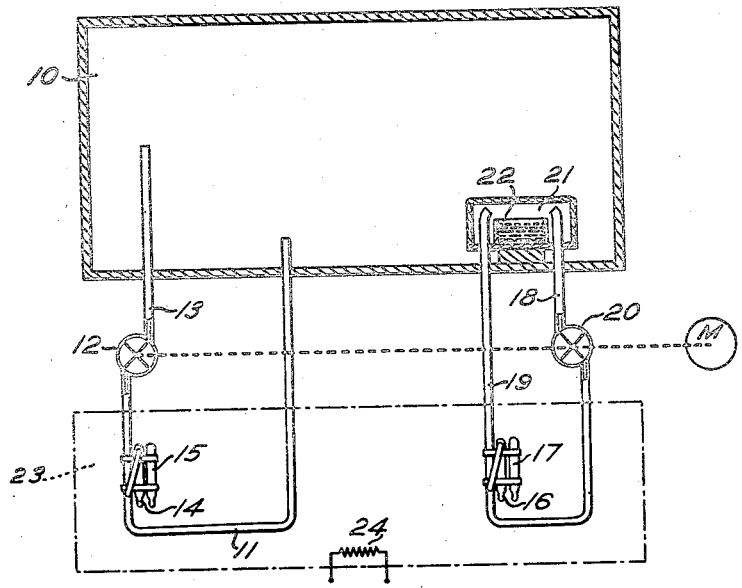

March 21, 1950 R. H. CHERRY 2,501,377
RELATIVE HUMIDITY MEASURING SYSTEM
Filed July 27, 1945 3 Sheets-Sheet 2

INVENTOR.
ROBERT H. CHERRY
BY Virgil E. Woodcock
ATTORNEY

Patented Mar. 21, 1950

2,501,377

UNITED STATES PATENT OFFICE 2,501,377

RELATIVE HUMIDITY MEASURING SYSTEM

Robert H. Cherry, Glenside, Pa., assignor to Leeds and Northrup Company, Philadelphia, Pa., a corporation of Pennsylvania Application July 27, 1945, Serial No. 608,284

4 Claims. (Cl. 73—335)

This invention relates to systems for measuring humidity and has for an object the provision of a simple and reliable system for directly measuring relative humidities.

For many years the wet-and-dry-bulb hygrometer has been widely used to measure relative humidities. With modern improvements, it has been relatively satisfactory within certain temperature ranges but not so satisfactory for determination of humidities below about twenty per cent for temperatures around 77° F. There are systems of measuring relative humidity such as the hair hygrometer, which have undesirable characteristics which limit their usefulness.

It has heretofore been proposed to utilize thermal conductivity cells for determination of absolute humidity. Absolute humidity may be defined as the weight of water vapor in a unit volume of gas. Relative humidity is usually of greater interest and it may be defined as the ratio of the weight of water vapor in a given volume of gas to the maximum amount of water vapor which that volume can hold at the same temperature. Thus, this ratio is unity when gas at a given temperature has present in it all of the water vapor which it is capable of containing. It is then said to have a relative humidity of 100 per cent. Its relative humidity will have a value of zero when there is no water vapor present. Heretofore the thermal conductivity cell has been used to measure the absolute humidity or to measure the moisture deficiency of the air under measurement. In order to determine the relative humidity from such measurements the following additional steps must be carried out. The temperature at which the measurements were made must be noted. Reference must then be made to tables to determine the maximum absolute humidity for the gas at the observed temperature. The relative humidity may then be determined from the ratio of the two absolute humidities. Obviously, such systems are not applicable to continuous measurement of relative humidity and require many operations on the part of an observer.

In carrying out the present invention in one form thereof, relative humidities are continuously determined by utilizing one or more thermal conductivity cells. These cells are included in a system which yields directly relative humidities and which makes unnecessary calculations or reference to tables and the like. More particularly, two measuring networks are provided. One network includes at least one thermal conductivity cell through which passes the gas whose absolute humidity determines the thermal conductivity thereof. This network produces an output voltage which varies exponentially with the absolute humidity of the gas. The other network produces a voltage which varies exponentially with the maximum absolute humidity which the gas may attain over a temperature range. The ratio of the two voltages is electrically determined to yield direct indications of relative humidity. In one form of the invention, the outputs of the respective measuring networks are connected in series-circuit relation with a galvanometer. An impedance, connected as a potentiometer to one network, is then adjusted until the current through the galvanometer is reduced to zero. The relative humidity is determined directly by the extent of the adjustment required of the impedance to reduce the galvanometer current to zero.

Figure 2:
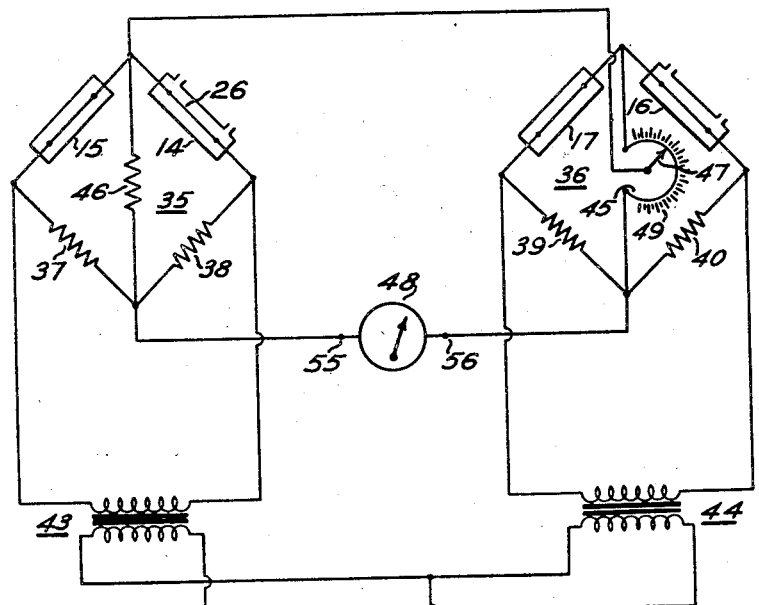
Figure 3:
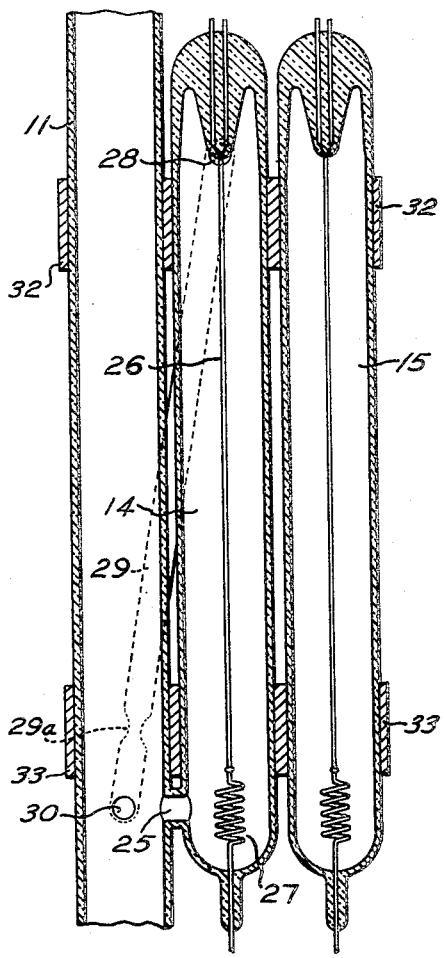
Figure 4:
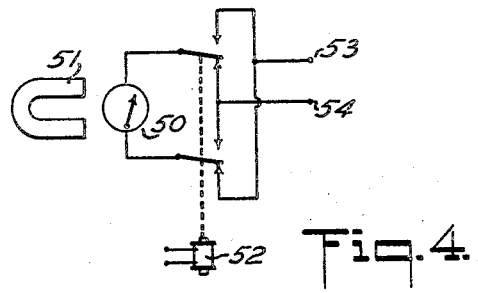
Figure 5:
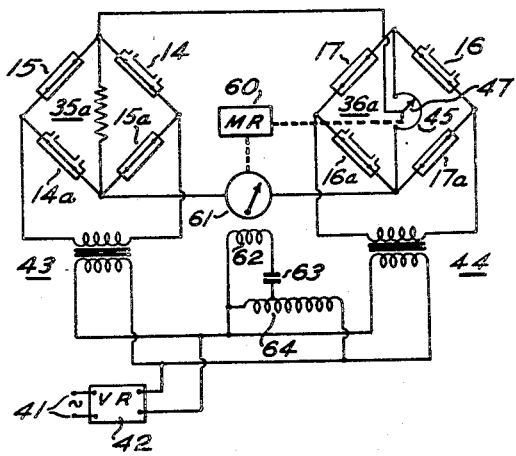
Figure 6:
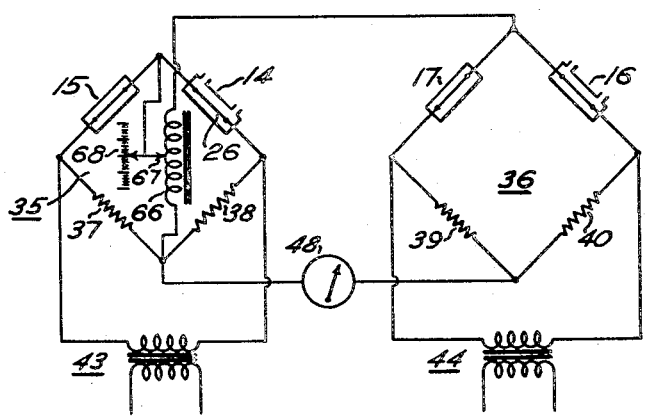
Figure 7:
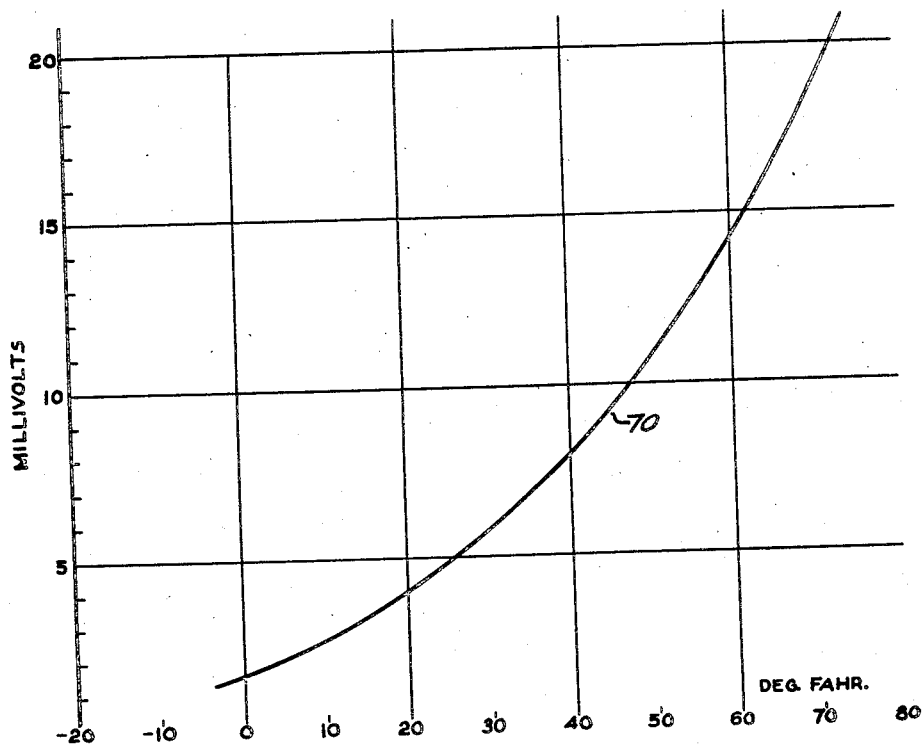
Figure 8:
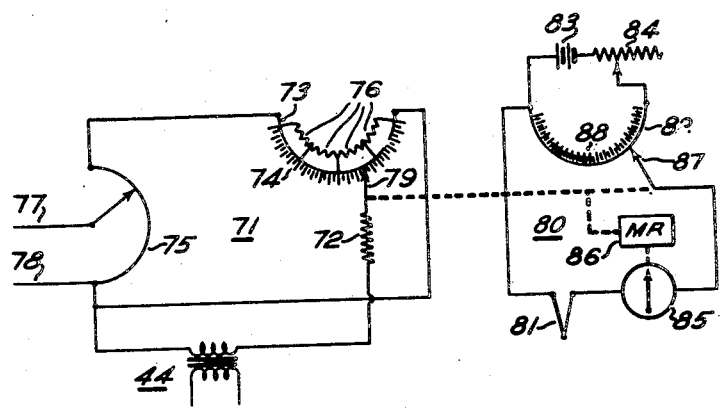

For a more complete understanding of the invention and for further objects and advantages thereof, reference should now be had to the following description taken in conjunction with the accompanying drawings in which:

Fig. 1 diagrammatically illustrates one application of the invention;

Fig. 2 diagrammatically illustrates an electrical system embodying the invention;

Fig. 3 is a sectional view of thermal conductivity cells utilized in the systems of Figs. 1 and 2;

Fig. 4 diagrammatically illustrates the manner in which a direct current galvanometer may be utilized in the alternating current circuits of Figs. 2 and 5;

Figs. 5–6 diagrammatically illustrate further preferred forms of the invention;

Fig. 7 is a graph illustrating typical variations in the voltage or potential difference derived from the second networks of Figs. 5 and 8; and Fig. 8 diagrammatically illustrates a still further preferred form of the invention.

Referring to the drawings, the invention has been illustrated as applied to the direct measurement of the relative humidity of the gas or atmosphere within an enclosed space 10. The enclosed space 10 may be a room, a drying oven, or humidity chamber of the type in which it is important continuously to measure or to control the relative humidity regardless of whether it shall be very high or very low. Gas is continuously withdrawn from the space 10 through a pipe or tube 11 by means of a fan 12, driven by a motor M. The gas is returned by way of a pipe 13 to the space 10. A thermal conductivity cell 14 is flow-connected to the tube 11 for circulation therethrough of a quantity of gas which will be independent of the velocity of flow through the tube 11. A second thermal conductivity cell 15 is mounted adjacent the cell 14 so as to be subject to the same ambient temperature. A second pair of thermal conductivity cells 16 and 17 are similarly disposed with respect to pipes or tubing 18 and 19. By means of a fan 20, driven by the motor M, gas is circulated from an enclosed chamber 21 within which there is disposed a quantity of water 22. The body of water 22 maintains the gas within the chamber 21 saturated at the existing temperature. The chamber 21 is isolated from the space 10, but its temperature will be the same because it is disposed therein. The chamber 21 and the tubing 18 and 19 comprise an enclosed system through which there is circulated a gas saturated with moisture at the temperature of the space 10. Preferably, the thermal conductivity cells 14—17 are disposed within a chamber 23, maintained by heating means shown as an electrical resistor 24 at a temperature higher than that of the space 10. It is desirable to have the temperature higher to avoid condensation of moisture due to circulation of the saturated air from chamber 21 to a zone of lower temperature. Any condensation of moisture would reduce the absolute humidity of the gas passing through the reference cell 16 and deleteriously affect the measurements.

The thermal conductivity cells may be of any suitable form such, for example, as shown in Peters Patent 1,504,707, although the construction as shown in Fredericks Patent 2,045,640 is preferred. Briefly, Fig. 3, the conductivity cell 14 is attached to the tube 11 through walls forming the inlet opening 25. There extends downwardly through the cell 14 a bifilar filament 26, maintained under tension by a spring 27. The filament 26 is preferably of platinum wire. Current flowing through the filament 26 elevates its temperature and heats the gas therein. Thermal circulation is thereby produced, the return path being by way of an opening 28 and return tube 29 which terminates in an opening 30 located directly in line with the inlet 25. For enhanced sensitivity, the tube 29 is provided with a constriction 29a which limits the rate of circulation of the gas through the cell 14. By means of clamps 32 and 33, the cells 14 and 15 may be supported from the tube 11 and adjacent each other.

The cells 16 and 17 are identical in construction with the cells 14 and 15 and they are similarly supported from the tube or pipe 19.

As shown in Fig. 2, the cells 14 and 15 are connected in a measuring network 35, while the cells 16 and 17 are connected in a separate measuring network 36. As shown, these networks are of the Wheatstone bridge type. The network 35 includes resistors 37 and 38 which form the remaining two arms of the bridge. Similarly resistors 39 and 40 form the remaining two arms of the bridge 36. Both bridges or networks are supplied from the same source of power indicated as an alternating current source 41. The voltage of the source 41 should have a constant value. For most applications it will be desirable to provide a voltage regulator 42 to maintain constant the voltage applied to the two networks as by transformers 43 and 44.

The resistance values of the elements in the respective arms of the networks 35 and 36 are so selected that each network will be in balance when the absolute humidities of the gases passing through the cells 14 and 16 are zero. As the absolute humidity rises in the gas passing through the cell 14, the higher moisture content reduces the temperature of the filament 26 and thus decreases its resistance. The change in resistance unbalances the Wheatstone bridge 35 by an amount related to the absolute humidity. The higher the absolute humidity, the more the bridge 35 will be unbalanced. Since the gas passing through the cell 16 is always saturated at the temperature of the chamber 21, Fig. 1, the bridge 36 will, in general, be unbalanced to a greater extent than the bridge 35. Accordingly, a variable impedance shown in the form of a slidewire 45 is connected across the output terminals of the bridge 36 to derive therefrom a fractional part of the unbalanced voltage. In order to equalize the performance of the two bridges, a fixed impedance shown in the form of a resistor 46 is connected across the output terminals of the bridge 35. The potentiometer formed by the resistor 45 is adjusted by a contact 47 to derive from the network 36 an output potential equal to that of the network 35. This is readily accomplished by moving the movable contact 47 to a position determined by a suitable current or voltage responsive device such as a galvanometer 48 connected in series with the outputs of the networks 35 and 36. There is associated with the slidewire 45 a scale 49 calibrated in terms of relative humidity. In order for the scale 49 to be calibrated in terms of relative humidity, it is necessary that the potential differences across the output terminals of bridges 35 and 36 shall vary in identical manner with like changes in the absolute humidity. In accordance with the invention, it has been found that over a relatively wide range of temperatures the voltage output of each bridge or network varies exponentially with absolute humidity. This variation may be expressed algebraically as follows:

$$E = KX^n$$

where E equals the bridge output voltage, X equals the absolute humidity of the gas being measured, and where K and n are constants.

In one embodiment of the invention, Fig. 5, each of the thermal conductivity cells 14—17 and 14a—17a had resistances of 15 ohms when an alternating current voltage of 10.3 volts was applied to the input terminals of the networks 35a and 36a. Under these conditions and over a temperature range from 32° F. to 74° F., the constants K and n respectively had values of 9.44 and 0.765. In said embodiment of the invention the scale 49 was non-linear. The non-linearity of the scale 49 is due to the fact the output voltage of each bridge varies non-linearly with the absolute humidity. Accordingly, the ratio of one output voltage with respect to the other output voltage varies non-linearly with respect to relative humidity. A linear scale may be, and has been, used by making the slidewire 45 non-linear to compensate for the non-linearity of the output voltages of bridges 35 and 36. With a non-linear slidewire 45, a linear scale, such as 49, can be made to represent all relative humidities from zero to 100 per cent relative humidity and for temperatures between 32° F. and 74° F.

With a non-linear slidewire 45 and a linear scale 49 graduated from zero to 100, the following data are typical of that obtained in accordance with the invention.

| Relative Humidity, Per Cent | Scale Reading | | |
| --- | --- | --- | --- |
| | At 32° F. | At 50° F. | At 74° F. |
| 0 | 0 | 0 | 0 |
| 10 | 9.15 | 10.0 | 10.9 |
| 25 | 23.6 | 25.5 | 26.4 |
| 50 | 48.9 | 51.0 | 50.6 |
| 75 | 74.6 | 75.2 | 74.9 |
| 100 | 100 | 100 | 100 |

In many cases a direct current galvanometer will be preferred in the system of Fig. 2 in place of the alternating current type. As shown in Fig. 4 a direct current galvanometer 50 with an associated permanent magnet 51 is provided with a synchronous rectifier of the vibratory type. Diagrammatically it has been represented as comprising a solenoid 52 which will be energized from the output side of the voltage regulator 42. The input terminals 53 and 54 will be connected to the points 55 and 56 of Fig. 2 in place of the galvanometer 48. Accordingly, the galvanometer 50 will respond in sense and magnitude to the difference in potentials derived from the output terminals of bridges 35 and 36.

While the slidewire or resistor 45 may be manually adjusted, a mechanical relay including a galvanometer may be utilized automatically to adjust the slidewire 45 to balance the voltages derived from the output terminals of the two bridges 35 and 36. A mechanical relay of suitable type is fully described in Squibb Patent 1,935,732 and may be utilized to record the relative humidity of the gas passing through the cell 26.

As shown in Fig. 5, the mechanical relay 60 also controls the position of the slidewire 45 with respect to the associated contact 47 under the control of a galvanometer 61. In Fig. 5, the galvanometer 61 is shown as of the alternating current type. It is provided with a winding 62 connected through a capacitator 63 and step-down transformer 64 to the alternating current supply lines leading from the voltage regulator 42. For maximum sensitivity, the number of thermal conductivity cells may be doubled over those shown in Fig. 2. Thus, two reference cells 15 and 15a are shown in opposite arms of the bridge 35a of Fig. 5 while two measuring cells 14 and 14a are connected in opposite arms. Similarly, the bridge 36a comprises two reference cells 17 and 17a and two standard cells 16 and 16a. The measuring cells 14 and 14a will both be responsive to the absolute humidity of the gas under measurement, while the standard cells 16 and 16a will be responsive to the absolute humidity of the gas circulating through the enclosed chamber 21, of Fig. 1.

In the foregoing modifications of the invention, the enclosed system including the chamber 21, is to be taken as representative of a preferred way of saturating the gas under measurement at a given temperature, although it is to be understood modified flow systems may be utilized in place thereof.

In the foregoing forms of the invention, it will be observed that the slidewire or resistor 45 is connected across the output terminals of the second network or bridge 36. A fractional voltage is derived from that resistor of magnitude equal to the voltage across the output terminals of the first network 35. The relative humidity is determined from the magnitude of the fraction. In accordance with the form of the invention illustrated in Fig. 6, a portion of the winding of an auto-transformer 66 is connected across the output terminals of the bridge or network 35. The transformer winding as a whole is connected, through a circuit including the galvanometer 48, to the output terminals of the bridge or network 36. By adjusting the tap 67 on the auto-transformer 66 a voltage is derived from the transformer 66 equal and opposite to that developed across the output terminals of the bridge or network 36. The relative humidity is determined by means of a scale 68, associated with the tap 67. Thus, the relative humidity may be directly determined by deriving from one network a voltage equal to that developed in the other network. It may be further observed that a like transformer has not been connected across the bridge 36 for the reason that the impedance of the transformer 66 will be so high that its effect on the output voltage of the bridge 35 is insignificant. However, the transformer 66 may be connected across the output terminals of the bridge 36 instead of across the bridge 35. In such case, the entire winding will be connected across the output terminals of the bridge 36 and the transformer will operate as a step-down transformer instead of a step-up transformer.

In the preceding forms of the invention the second or reference network 36 serves the purpose of providing a voltage or potential difference, which at all times is representative of the maximum possible absolute humidity of the gas under measurement. This voltage or potential difference is a unique function of temperature. Accordingly it may be produced by means other than network 36. For example, referring to Fig. 7, a curve 70 has been plotted with temperature as abscissae and millivolts as ordinates. The curve 70 illustrates the output voltage of the bridge 36 over a relatively wide range of temperatures. The curve 70 was plotted from the following data:

| Temperatures, Degrees F. | Bridge Output Millivolts | Temperatures, Degrees F. | Bridge Output, Millivolts |
|---|---|---|---|
| −4.0 | 1.42 | 54.1 | 12.23 |
| 9.5 | 2.58 | 57.7 | 13.53 |
| 16.7 | 3.66 | 61.3 | 14.83 |
| 23.0 | 4.65 | 64.0 | 16.07 |
| 28.4 | 5.61 | 66.7 | 17.32 |
| 32.0 | 6.44 | 69.4 | 18.52 |
| 39.2 | 7.98 | 72.0 | 19.67 |
| 45.1 | 9.43 | 72.9 | 20.23 |
| 50.2 | 10.86 | 74.1 | 20.80 |

Further in accordance with the invention a network may be provided, Fig. 8, from which a voltage may be derived whose magnitude is determined from the temperature of the gas or atmosphere under measurement, in accordance with the curve 70 of Fig. 7 as shown. Thus, a network 71 receives power from the transformer 44. The network 71 includes a resistor 72, a slidewire 73 having associated therewith a temperature scale 74, and a slidewire 75. The slidewire 73 is preferably non-linear. It may be conveniently made non-linear by providing a plurality of resistors 76 respectively in shunt with selected sections thereof. The scale 74 may be calibrated in terms of the temperature range, shown by the curve of Fig. 7. The slidewire 75 is provided for derivation from the network 71 of any fractional part of the voltage produced across the terminals of the slidewire. The derived output voltage, as it appears across conductors 77 and 78, replaces the voltage from the output terminals of the reference network, such for example as the network 36 of Figs. 2 and 6.

In operation, the relative position between the contact 79 and the slidewire 73 is determined by means of the scale 74. The particular setting will be determined by the temperature of the gas whose relative humidity is to be determined. Thus if the temperature of the space 10, Fig. 1, should be 23° F., the contact 79 would be set on the scale 74 opposite "23.0." There would then appear across the terminals of the slidewire 75 a potential difference of 4.65 millivolts. If the temperature of the space 10 were 64° F. and the contact 79 were set accordingly, the potential difference across the terminals of the slidewire 75 would be 16.07 millivolts. While manual operation of the contact 79 relative to the slidewire 74 is entirely feasible, it is preferred to adjust the setting by means of a temperature-responsive system 80 which may comprise a thermocouple 81, and a potentiometer, the latter includes a slidewire 82, a battery 83, and an adjustable resistor 84. By means of a galvanometer 85 and an associated mechanical relay 86, relative adjustment of the slidewire 82 and its associated contact 87 may be automatically made. The mechanical relay 86 similarly effects relative adjustment between the position of the slidewire 74 and its associated contact 79. A temperature scale 88 may be associated with the slidewire 82 and the temperature scale 74 omitted. The system as a whole, Fig. 8, may replace the standard networks previously described, particularly the networks 36 of Figs. 2 and 6 and network 36a of Fig. 5.

With the foregoing explanation of the principles of the invention, it will be understood that further modifications of the invention may be made within the spirit and scope of the invention as set forth in the appended claims.

What is claimed is:

1. A system for determining the relative humidity of an atmosphere, comprising a balanceable network including means for unbalancing the network in response to deviation in the absolute humidity of said atmosphere from a predetermined magnitude, a second balanceable network having means therein for unbalancing it by an amount related to the deviation of the maximum possible absolute humidity of the atmosphere at the temperature of said atmosphere from a predetermined magnitude, said networks having components therein for producing balance thereof when said unbalancing means are simultaneously subjected to zero absolute humidity, each of said balanceable networks producing potential differences which vary in like manner with like changes in absolute humidity, and a circuit interconnecting said networks and including an impedance for determining said relative humidity by deriving from said second network a fractional potential difference equal to that produced by unbalance of said first-named network.

2. A system for determining the relative humidity of a gas, comprising a balanceable network having at least one thermal conductivity cell whose resistance is varied by an amount related to deviation of the absolute humidity of the gas from a predetermined magnitude for unbalancing said network, a second balanceable network having at least one thermal conductivity cell whose resistance is varied to produce unbalance by an amount related to the deviation of the maximum possible absolute humidity of the gas from a predetermined magnitude at the temperature of said gas, said networks having components therein for producing balance thereof when said unbalancing means are simultaneously subjected to zero absolute humidity, each of said balanceable networks producing potential differences which vary in like manner with like changes in absolute humidity, a circuit interconnecting said networks and including a slidewire for deriving from said second network a fractional part of the potential difference produced by the unbalance thereof, and means for adjusting said slidewire until said derived potential difference equals that developed by the unbalance of said first network in measurement of the relative humidity of said gas.

3. A system for determining the relative humidity of an atmosphere, comprising a Wheatstone bridge having a thermal conductivity cell in one arm thereof, said cell being sealed with a dry atmosphere therein, a second thermal conductivity cell in a second arm of said bridge, means for introducing into said second cell the atmosphere whose relative humidity is to be determined, a second Wheatstone bridge having a thermal conductivity cell with a dry atmosphere included in one arm thereof, a thermal conductivity cell in another arm thereof having an atmosphere saturated at the temperature of the atmosphere under measurement, resistors included in the remaining arms of said bridges normally producing balance thereof when all of said cells are exposed to dry atmospheres, an electrical circuit connected to said bridges and including means for determining the ratio of unbalance of one bridge with respect to the other, and means for directly determining from said ratio the relative humidity of said atmosphere.

4. A system of determining the relative humidity of a gas comprising a balanceable electrical network including thermal conductivity means responsive to deviation of the absolute humidity of the gas from a predetermined magnitude for unbalancing said network, a second electrical network including a second thermal conductivity means responsive to deviation in the maximum possible absolute humidity of the gas at the temperature of said gas from a predetermined magnitude for unbalancing said second network, an electrical circuit interconnecting said networks including means responsive to the relative unbalance of one network with respect to the other network, and means for applying to said circuit that fractional part of the larger unbalance from one of said networks equal to the unbalance of the other of said networks for indication of the relative humidity in terms of the ratio of the unbalance of one network with respect to the other.

ROBERT H. CHERRY.

REFERENCES CITED

The following references are of record in the file of this patent:

UNITED STATES PATENTS

| Number | Name | Date |
|---|---|---|
| 1,493,586 | Wood | May 13, 1924 |
| 1,758,494 | Behr | May 13, 1930 |
| 1,855,774 | Schneider | Apr. 26, 1932 |
| 1,956,386 | Gruss | Apr. 24, 1934 |
| 2,349,860 | Hainer | May 30, 1944 |

FOREIGN PATENTS

| Number | Country | Date |
|---|---|---|
| 373,239 | Germany | Apr. 9, 1923 |
| 570,781 | Germany | Jan. 31, 1931 |